(12) United States Patent
Kim (10) Patent No.: US 8,606,431 B2
(45) Date of Patent: Dec. 10, 2013

(54) SYSTEM AND METHOD FOR TRACKING LOCATION OF CONSTRUCTION EQUIPMENT

(75) Inventor: Jae Hoon Kim, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 13/502,295

(22) PCT Filed: Oct. 7, 2010

(86) PCT No.: PCT/KR2010/006859
§ 371 (c)(1),
(2), (4) Date: Apr. 16, 2012

(87) PCT Pub. No.: WO2011/046321
PCT Pub. Date: Apr. 21, 2011

(65) Prior Publication Data
US 2012/0221178 A1    Aug. 30, 2012

(30) Foreign Application Priority Data
Oct. 14, 2009 (KR) .................. 10-2009-0097568

(51) Int. Cl.
*G08G 1/123* (2006.01)
*B60R 25/33* (2013.01)

(52) U.S. Cl.
USPC ......... 701/2; 701/412; 455/456.1; 455/456.3; 340/989; 340/992; 340/993

(58) Field of Classification Search
None
See application file for complete search history.

(56) References Cited

U.S. PATENT DOCUMENTS

| | | |
|---|---|---|
| 2004/0210371 A1 | 10/2004 | Adachi et al. |
| 2004/0230372 A1 | 11/2004 | Chang |
| 2008/0192937 A1* | 8/2008 | Challener .................. 380/278 |
| 2010/0097208 A1* | 4/2010 | Rosing et al. ............ 340/539.13 |
| 2010/0145865 A1* | 6/2010 | Berger et al. .................. 705/307 |

(Continued)

FOREIGN PATENT DOCUMENTS

| | | |
|---|---|---|
| EP | 1221684 A1 | 7/2002 |
| JP | 08-178649 A | 7/1996 |
| JP | 2003-027528 A | 1/2003 |
| KR | 10-2003-0019656 A | 3/2003 |

OTHER PUBLICATIONS

Search Report dated Jun. 7, 2011 written in Korean with English translation attached for International Application No. PCT/KR2010/006859, filed Oct. 7, 2010, pp. 1-5.

(Continued)

*Primary Examiner* — James Trammell
*Assistant Examiner* — Demetra Smith-Stewart
(74) *Attorney, Agent, or Firm* — John D. Veldhuis-Kroeze; Westman, Champlin & Koehler, P.A.

(57) ABSTRACT

The present disclosure relates to a method capable of reducing a communication cost for tracking a location of construction equipment by controlling a transmission cycle of locational information of the construction equipment.

To this end, the present disclosure provides a method for tracking a location of construction equipment by using a tracking vehicle, including: transmitting locational information from the construction equipment at a predetermined transmission cycle; calculating a distance between the construction equipment and the tracking vehicle based on the locational information received from the construction equipment; and if the calculated distance is less than a predetermined value, commanding that a transmission cycle of the locational information of the construction equipment be made shorter than a predetermined transmission cycle.

9 Claims, 3 Drawing Sheets

(56) References Cited

U.S. PATENT DOCUMENTS

2011/0241904 A1* 10/2011 Cho .............................. 340/989
2012/0178475 A1* 7/2012 Yasuhara et al. ........... 455/456.3
2012/0312250 A1* 12/2012 Jesurum ........................ 119/721

OTHER PUBLICATIONS

Extended European Search Report dated Feb. 18, 2013 issued for European application No. 08866969.2, 3 pages.

* cited by examiner

SYSTEM AND METHOD FOR TRACKING LOCATION OF CONSTRUCTION EQUIPMENT

This Application is a Section 371 National Stage Application of International Application No. PCT/KR2010/006859, filed Oct. 7, 2010 and published, not in English, as WO2011/046321 on Apr. 21, 2011.

FIELD OF THE DISCLOSURE

The present disclosure relates to a system and a method for tracking a position of construction equipment, and more particularly, to a system and a method for tracking a location of construction equipment that can reduce a communication cost for tracking a location by controlling a transmission cycle of locational information of construction equipment.

BACKGROUND OF THE DISCLOSURE

In general, in a remote management system of construction equipment, construction equipment such as an excavator, a wheel loader, or the like transmits, to a management server for managing construction equipment using a mobile communication network or a satellite communication network, information including engine rpm (radius per minute), battery voltage, the temperature of cooling water, the temperature of oil, on/off sensing information of various switches, on/off sensing information of solenoids or relays, error code, an operation time for each operation mode, an engine operation time, a filter/oil using time, the pressures of a pump and a cylinder, fuel information, load rate information, locational information, and the like of the equipment.

Further, when an event for tracking a location of construction equipment (for example, the occurrence of a theft situation and the like) occurs, the construction equipment is configured to transmit locational information of construction equipment to the management server at a shorter cycle than a predetermined cycle.

However, a method of shortening a transmission cycle of locational information from the point of time of starting to track a location of construction equipment has a disadvantage in that a data transmission amount is increased, leading to an increase in communication costs.

Therefore, it is required to develop a technology capable of reducing a communication cost for tracking a location of construction equipment and of more rapidly and easily tracking stolen equipment by exactly determining a location of moving construction equipment.

The discussion above is merely provided for general background information and is not intended to be used as an aid in determining the scope of the claimed subject matter.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Accordingly, the present disclosure provides a method for tracking construction equipment that can reduce a communication cost incurred as a transmission cycle of locational information becomes shorter when tracking construction equipment and more rapidly and easily track the construction equipment by exactly determining a location of stolen equipment which is on the move.

In order to achieve the above object, the present disclosure provides a method for tracking a location of construction equipment by using a tracking vehicle, including: (a) transmitting locational information from the construction equipment at a predetermined transmission cycle; (b) calculating a distance between the construction equipment and the tracking vehicle based on the locational information received from the construction equipment; and (c) comparing the distance acquired by the calculation with a predetermined value and if the distance is less than the predetermined value, commanding that a transmission cycle of the locational information of the construction equipment be made shorter than the predetermined transmission cycle.

According to an exemplary embodiment of the present disclosure, in process (b), the received locational information of the previous transmission cycle is stored and compared with current locational information which is received in real time, and as a result of the comparison, if the location of the construction equipment is changed, in process (c), it is commanded that the transmission cycle be made shorter than the predetermined transmission cycle.

According to an exemplary embodiment of the present disclosure, in process (c), if the distance acquired by calculating the distance between the construction equipment and the tracking vehicle is less than the predetermined value, it is commanded that a transmission cycle of locational information of a construction equipment-side communication terminal be changed in proportion to the calculated distance.

Further, the present disclosure provides a system for tracking a location of construction equipment including construction equipment to be tracked, a tracking vehicle tracking the construction equipment, and a management server communicating with the construction equipment and the tracking vehicle to provide information such that the tracking vehicle tracks a location of the construction equipment, the system including: a GPS unit installed in the construction equipment to provide locational information of the construction equipment; a construction equipment-side communication modem unit installed in the construction equipment to transmit and receive locational information of the construction equipment to and from the outside at a predetermined transmission cycle; a tracking vehicle-side GPS unit installed in the tracking vehicle to provide locational information of the tracking vehicle; a tracking vehicle-side communication modem unit installed in the tracking vehicle to transmit and receive locational information of the tracking vehicle to and from the outside at a predetermined transmission cycle; a management server-side communication unit installed in the management server to transmit and receive information to and from the construction equipment-side communication modem unit and the tracking vehicle-side communication modem unit at a predetermined transmission cycle, respectively; and a control unit installed in the management server to calculate a distance between the construction equipment and the tracking vehicle based on the locational information of the construction equipment and the tracking vehicle received through the management server-side communication unit, and commanding the construction equipment-side communication modem that the transmission cycle of the location of the construction equipment be made shorter than a predetermined transmission cycle, if the calculated distance value is smaller than a predetermined distance value.

According to an exemplary embodiment of the present disclosure, the control unit stores the locational information of the construction equipment received from the construction equipment-side modem unit, and compares the locational information with current locational information of the construction equipment that is received in real time, and if the locational information of the construction equipment is changed, the control unit commands that the transmission cycle of the locational information of the construction equipment be made shorter than the predetermined transmission cycle.

According to an exemplary embodiment of the present disclosure, if the distance acquired by calculating the distance between the construction equipment and the tracking vehicle is less than the predetermined value, the control unit commands that a transmission cycle of locational information of a construction equipment-side communication terminal be changed in proportion to the calculated distance.

According to the present disclosure, instead of shortening a transmission cycle of locational information of construction equipment immediately from the point of time of tracking a location of the construction equipment, when the distance between the construction equipment and the tracking vehicle is less than the predetermined value D, the transmission cycle of the locational information of the construction equipment is changed to be shorter than an existing transmission cycle, and as result of determining whether the construction equipment is moved, when the construction equipment is moved, the transmission cycle of the locational information of the construction equipment is changed to be shorter than the existing transmission cycle.

Therefore, the present disclosure provides an effect of reducing a communication cost as compared to a method in the related art of unconditionally shortening a transmission cycle when tracking a location of construction equipment, and it is possible to more rapidly and easily track the location by exactly determining the location of the moving construction equipment.

| | |
|---|---|
| 100: Construction equipment | 102: Control unit |
| 104: GPS unit | 106: Communication modem unit |
| 110: Management server | 112: Control unit |
| 114: Communication unit | 120: Tracking vehicle |
| 122: Control unit | 124: Communication modem unit |
| 126: GPS unit | 130: Network |

DETAILED DESCRIPTION

Hereinafter, exemplary embodiments of the present disclosure will be described in detail with reference to the accompanying drawings. It should be noted that the same components refer to the same reference numerals anywhere as possible in the drawings. In the following description, specific detailed matters will be described and are provided for the more overall understanding of the present disclosure.

Further, in describing the present disclosure, when it is determined that detailed description relating to well-known functions or configurations may make the subject matter of the present disclosure unnecessarily ambiguous, the detailed description will be omitted.

First, a configuration of a system for tracking a location of construction equipment according to an exemplary embodiment of the present disclosure will be described with reference to FIG. 1.

Figure 1:
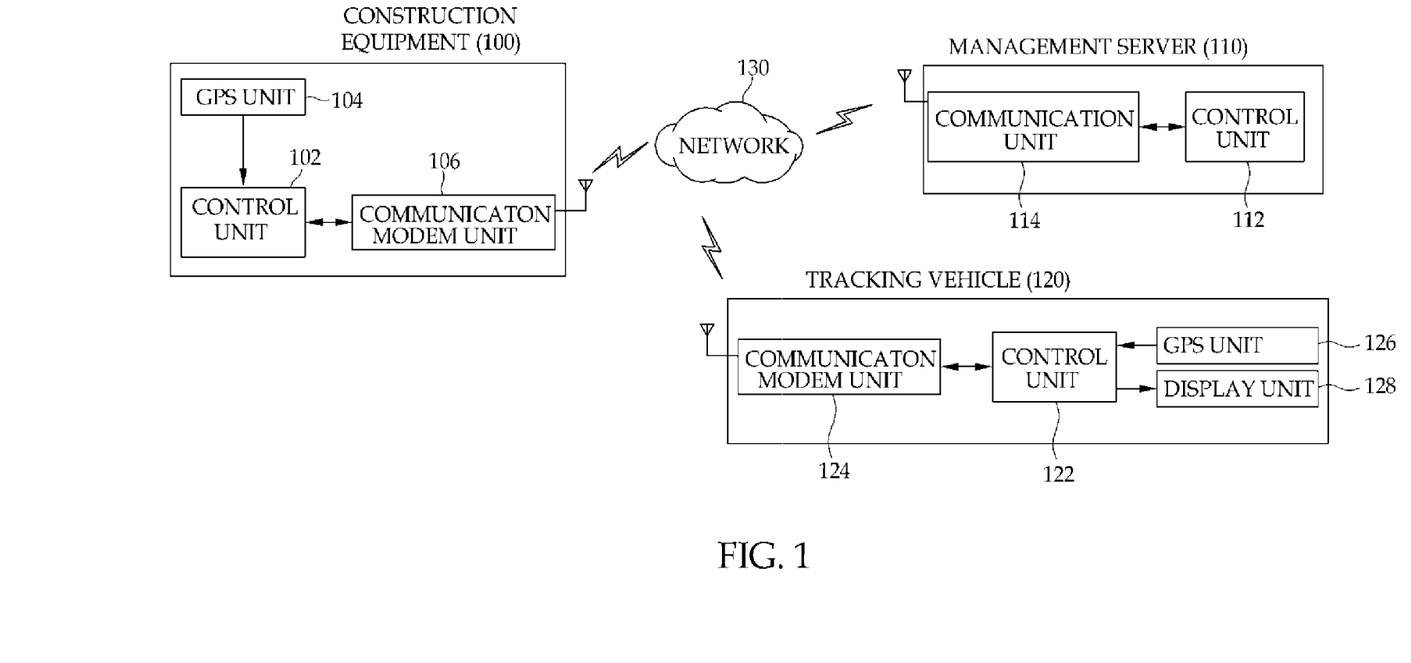
FIG. 1 is a configuration diagram of a system for tracking a location of construction equipment according to an exemplary embodiment of the present disclosure.

Referring to FIG. 1, the system for tracking a location of construction equipment includes construction equipment 100, a management server 110 for remotely managing information of construction equipment, and a tracking vehicle 120. At this time, the construction equipment 100 communicates with the management server 110 or the tracking vehicle 120 through a network (a mobile communication network or a satellite communication network).

First, the construction equipment 100 includes a control unit 102, a GPS unit 104, and a communication modem unit 106.

The GPS unit 104 receives signals transmitted from a plurality of GPS satellites to determine a location of construction equipment. In other words, the locational information of the construction equipment 100 may be calculated through the GPS unit 104.

The communication modem unit 106 may include a satellite communication modem for transmitting and receiving data through a satellite communication network or a mobile communication modem for transmitting and receiving data through a mobile communication network. The communication modem unit 106 transmits and receives locational information of the construction equipment to and from the outside (tracking vehicle 120 or management server 110) at a predetermined transmission cycle.

The control unit 101 transmits the locational information of the construction equipment 100 calculated by the GPS unit 104 to the tracking vehicle 120 or the management server 110 through the communication modem unit 106 at the predetermined transmission cycle.

The management server 110 includes a communication unit 114 and a control unit 112.

The communication unit 114 transmits and receives information to and from the construction equipment-side communication modem unit 106 and a tracking vehicle-side communication modem unit 120 through the network 130 at the predetermined transmission cycle.

The control unit 112 calculates a distance between the construction equipment and the tracking vehicle based on the locational information of the construction equipment 100 and the tracking vehicle 120 that is provided through the communication unit 114. Thereafter, when the calculated distance value is smaller than a predetermined distance value, the control unit 112 commands that the construction equipment-side communication modem 106 make a transmission cycle of the location of the construction equipment shorter than the predetermined transmission cycle.

Further, the control unit 112 stores the locational information of the construction equipment 100 received from the construction equipment-side communication modem unit 106, and compares the locational information with current locational information of the construction equipment 100 that is received in real time. Thereafter, when the locational information of the construction equipment 100 is changed, the control unit 112 commands that the transmission cycle of the locational information of the construction equipment 100 be made shorter than the predetermined transmission cycle. At this time, the command is transmitted to the communication modem unit 106 of the construction equipment 100 through the communication unit 114.

Lastly, the tracking vehicle 120 includes a control unit 122, a communication modem unit 124, a GPS unit 126, and a display unit 128.

The communication modem unit 124 may include a satellite communication modem for transmitting and receiving data through a satellite communication network or a mobile communication modem for transmitting and receiving data through a mobile communication network. The communication modem unit 124 transmits and receives locational information of the tracking vehicle 120 to and from the outside (construction equipment 100 and management server 110) at a predetermined transmission cycle.

The GPS unit 126 receives signals transmitted from a plurality of GPS satellites to determine a location of the tracking vehicle 120. In other words, the locational information of the tracking vehicle 120 may be calculated by the GPS unit 126.

The display unit 128 may be constituted by a liquid crystal display (LCD) and the like and may display the locational information of the construction equipment 100 or display both the locational information of the construction equipment and the locational information of the tracking vehicle 120. Further, when displaying the information, only a direction and a distance may be displayed and locational information may also be displayed on an electronic map.

The control unit 122 calculates a distance between the tracking vehicle 120 and the construction equipment 100 based on the locational information that is received from the construction equipment-side communication modem unit 106 and the locational information that is provided from the tracking vehicle-side GPS unit 126. Thereafter, when the calculated distance value is smaller than a predetermined distance value, the control unit 122 commands that the construction equipment-side communication modem unit 106 make the transmission cycle of the location of the construction equipment 100 shorter than the predetermined transmission cycle. At this time, the command may be transmitted to the construction equipment-side communication modem unit 106 through the communication modem unit 124.

Further, the control unit 122 stores the locational information of the construction equipment 100 received from the construction equipment-side communication modem unit 106, and compares the locational information with current locational information of the construction equipment 100 that is received in real time. As a result of the comparison, if the locational information of the construction equipment 100 is changed, the control unit 122 commands that the transmission cycle of the locational information of the construction equipment 100 be made shorter than the predetermined transmission cycle.

Meanwhile, when the construction equipment 100 is stolen, only location-related information is transmitted to the management server 100 or the tracking vehicle 120 and the rest of information (maintenance-related information) is not transmitted, thereby reducing a communication cost.

With respect to the exemplary embodiments of the present disclosure, a first exemplary embodiment in which a location of construction equipment is tracked by the tracking vehicle 120 and a second exemplary embodiment in which the location is tracked by the management server 110 will be described.

First Exemplary Embodiment

Figure 2:
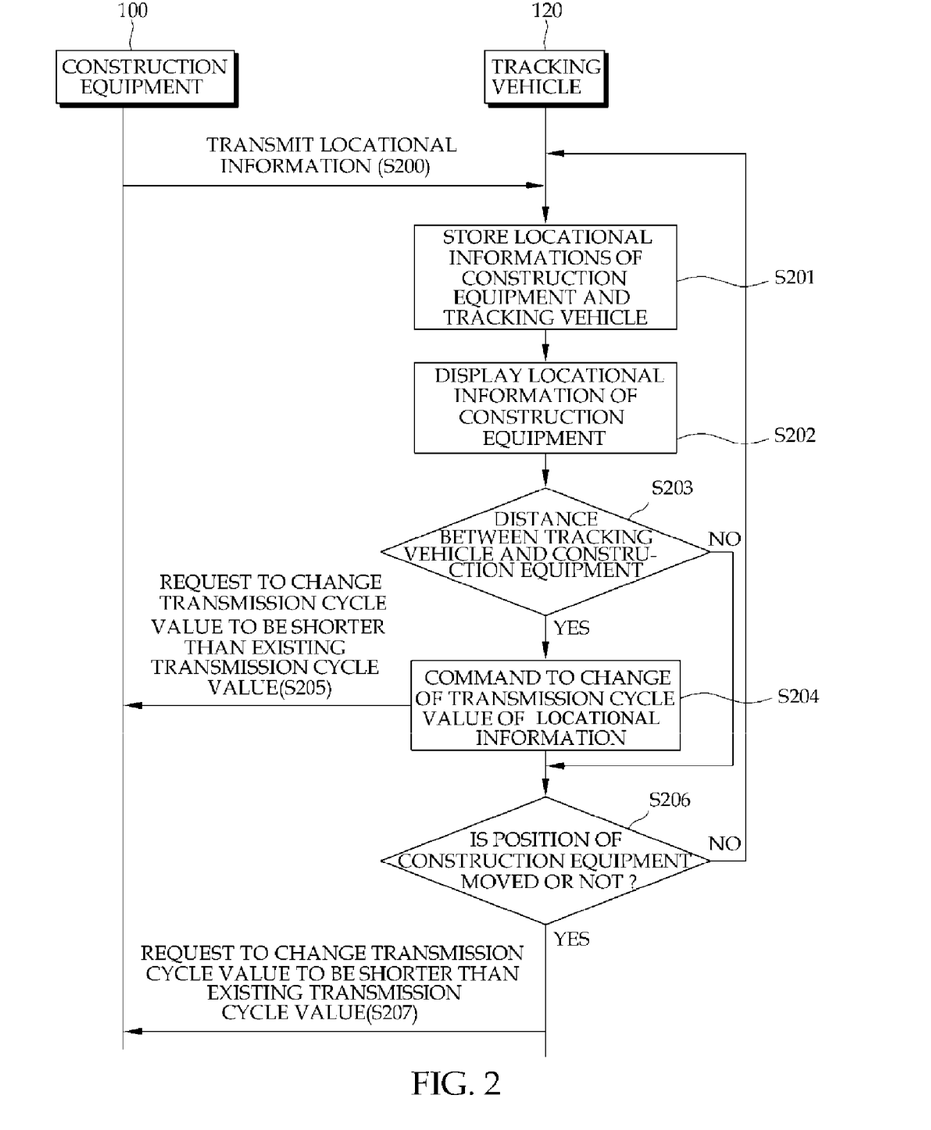
FIG. 2 is a signal flow chart showing a process of tracking a location of construction equipment according to a first exemplary embodiment of the present disclosure.

FIG. 2 is a signal flow chart showing a process of tracking a location of construction equipment according to the first exemplary embodiment of the present disclosure.

First, the construction equipment 100 transmits locational information to the tracking vehicle 120 (S200).

After storing the received locational information of the construction equipment 100 and locational information of the tracking vehicle 120 which is calculated through the GPS unit 126, the tracking vehicle 120 displays the locational information of the construction equipment 100 through the display unit 128 (S201 and S202).

Thereafter, the tracking vehicle 120 examines whether a distance between the tracking vehicle 120 and the construction equipment 100 is less than a predetermined value D (S203). As a result of the examination, if the distance between the tracking vehicle 120 and the construction equipment 100 is less than the predetermined value D, the process proceeds to step S204 and if not, the process proceeds to step S206.

In step S204, the tracking vehicle 120 commands the change of a transmission cycle value of the locational information of the construction equipment 100. Accordingly, the tracking vehicle 120 requests the construction equipment 100 to change the transmission cycle value to be shorter than an existing transmission cycle value (S205).

In the meantime, the tracking vehicle 120 examines whether the location of the construction equipment 100 is moved in step S206.

As a result of the examination, if the location of the construction equipment 100 is moved, the tracking vehicle 120 requests the construction equipment 100 to change the transmission cycle value to be shorter than the existing transmission cycle value (S207).

Further, after step S207, if there is no event for stopping tracking the location of the construction equipment 100, the process proceeds to step S200 and the tracking vehicle 120 continuously receives locational information from the construction equipment 100 to perform an operation for tracking the location of the construction equipment 100.

However, if the location of the construction equipment 100 is not moved, the process proceeds to step S201 to continuously perform the operation for tracking the location of the construction equipment 100.

Second Exemplary Embodiment

Figure 3:
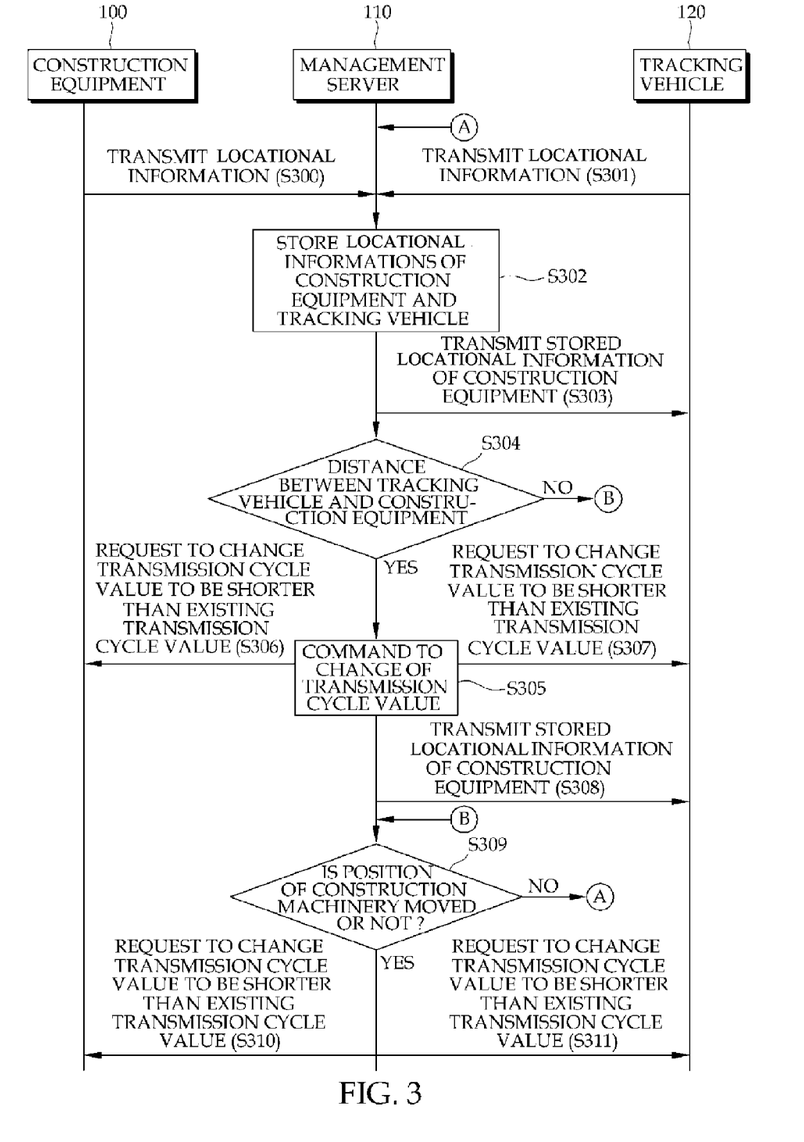
FIG. 3 is a signal flow chart showing a process of tracking a location of construction equipment according to a second exemplary embodiment of the present disclosure.

FIG. 3 is a signal flow chart showing a process of tracking a location of construction equipment according to a second exemplary embodiment of the present disclosure.

Referring to FIG. 3, the construction equipment 100 and the tracking vehicle 120 transmit respective locational information to the management server 110 (S300 and S301).

After storing the received locational information of the construction equipment 100 and the tracking vehicle 120, the management server 110 transmits the stored locational information of the construction equipment 100 to the tracking vehicle 120 (S302 and S303). At this time, the tracking vehicle 120 may display the received locational information of the construction equipment 100 through the display unit 128 depending on a set-up.

Thereafter, the management server 110 examines whether a distance between the tracking vehicle 120 and the construction equipment 100 is less than a predetermined value D (S304).

As a result of the examination, if the distance between the tracking vehicle 120 and the construction equipment 100 is less than the predetermined value D, the process proceeds to step S305 and if not, the process proceeds to step S309.

In step S305, the management server 110 commands the change of a transmission cycle value of the locational information of the construction equipment 100 and the tracking vehicle 120. Accordingly, the management server 110 request the construction equipment 100 and the tracking vehicle 120 to change the transmission cycle value to be shorter than an existing transmission cycle value (S306 and S307).

Further, the management server 110 transmits the stored locational information of the construction equipment 100 to the tracking vehicle 120 (S308).

Thereafter, in step S309, the management server 110 examines whether the location of the construction equipment 100 is moved.

As a result of the examination, if the location of the construction equipment 100 is moved, the management server 110 requests the construction equipment 100 and the tracking vehicle 120 to change the transmission cycle value to be shorter than the existing transmission cycle value (S310 and S311). Thereafter, if the tracking of the construction equipment 100 is completed, the transmission cycle value may be reset to an original set value.

Further, after steps S310 and S311, if there is no event for stopping tracking the location of the construction equipment 100, the process proceeds to steps S300 and S301 and the management server 110 continuously receives the respective locational information from the tracking vehicle 120 and the construction equipment 100 to perform an operation for tracking the location of the construction equipment 100.

However, if the location of the construction equipment 100 is not moved, the process proceeds to step S302 to continuously perform the operation for tracking the location of the construction equipment 100.

As described above, although certain exemplary embodiments of the present disclosure have been described in detail, it is to be understood by those skilled in the art that the spirit and scope of the present disclosure are not limited to the certain exemplary embodiments, but are intended to cover various modifications and changes without departing from the subject matter of the present disclosure.

Accordingly, since the aforementioned exemplary embodiments are provided to inform those skilled in the art to which the present disclosure pertains of the scope of the present disclosure, it should be understood that the exemplary embodiments are illustrative only in all aspects and are not intended to be in any way limiting, and the present disclosure is just defined by the scope of the appended claims.

The present disclosure can reduce a communication cost as compared to a method in the related art of unconditionally shortening a transmission cycle in the case of tracking a location by controlling the transmission cycle of the locational information of construction equipment depending on the distance between the construction equipment and the tracking vehicle in the case of tracking a location of construction equipment and can prevent a theft by exactly determining the location of moving construction equipment to rapidly track the location of the construction equipment.

The invention claimed is:

1. A method for tracking a location of construction equipment by using a tracking vehicle for tracing the construction equipment, comprising:
   (a) receiving locational information which has been transmitted from the construction equipment at a predetermined transmission cycle;
   (b) calculating a distance between the construction equipment and the tracking vehicle based on the locational information received from the construction equipment and locational information of the tracking vehicle; and
   (c) comparing, by a control unit, the distance acquired by the calculation with a predetermined value, and commanding that a transmission cycle of the locational information of the construction equipment be made shorter than the predetermined transmission cycle, if the distance is less than the predetermined value.

2. The method of claim 1, wherein in process (b), the received locational information of the previous transmission cycle is stored and compared with current locational information which is received in real time, and as a result of the comparison, if the location of the construction equipment is changed, in process (c), it is commanded that the transmission cycle be made shorter than the predetermined transmission cycle.

3. The method of claim 1, wherein in process (c), if the distance acquired by calculating the distance between the construction equipment and the tracking vehicle is less than the predetermined value, it is commanded that a transmission cycle of locational information of a construction equipment-side communication terminal be changed in proportion to the calculated distance.

4. A system for tracking a location of construction equipment including construction equipment to be tracked, a tracking vehicle tracking the construction equipment, and a management server communicating with the construction equipment and the tracking vehicle to provide information such that the tracking vehicle tracks a location of the construction equipment, the system comprising:
   a GPS unit installed in the construction equipment to provide locational information of the construction equipment;
   a construction equipment-side communication modem unit installed in the construction equipment to transmit and receive locational information of the construction equipment to and from the outside at a predetermined transmission cycle;
   a tracking vehicle-side GPS unit installed in the tracking vehicle to provide locational information of the tracking vehicle;
   a tracking vehicle-side communication modem unit installed in the tracking vehicle to transmit and receive locational information of the tracking vehicle to and from the outside at a predetermined transmission cycle;
   a management server-side communication unit installed in the management server to transmit and receive information to and from the construction equipment-side communication modem unit and the tracking vehicle-side communication modem unit at a predetermined transmission cycle, respectively; and
   a control unit installed in the management server to calculate a distance between the construction equipment and the tracking vehicle based on both the locational information of the construction equipment and locational information of the tracking vehicle received through the management server-side communication unit and command that the construction equipment-side communication modem make the transmission cycle of the location of the construction equipment shorter than a predetermined transmission cycle, if the calculated distance value is smaller than a predetermined distance value.

5. The system of claim 4, wherein the control unit stores the locational information of the construction equipment received from the construction equipment-side communication modem unit, and compares the locational information with current locational information of the construction equipment that is received in real time and if the locational information of the construction equipment is changed, the control unit commands that the transmission cycle of the locational information of the construction equipment be made shorter than the predetermined transmission cycle.

6. A system for tracking a location of construction equipment including construction equipment to be tracked and a tracking vehicle tracking the construction equipment and tracking a location of the construction equipment by the tracking vehicle, the system comprising:
- a GPS unit installed in the construction equipment to provide locational information of the construction equipment;
- a construction equipment-side communication modem unit installed in the construction equipment to transmit and receive the locational information of the construction equipment to and from the outside at a predetermined transmission cycle;
- a tracking vehicle-side GPS unit installed in the tracking vehicle to provide locational information of the tracking vehicle;
- a tracking vehicle-side communication modem unit installed in the tracking vehicle to transmit and receive the locational information of the tracking vehicle to and from the outside at a predetermined transmission cycle; and
- a control unit installed in the tracking vehicle to calculate a distance between the construction equipment and the tracking vehicle based on the locational information received from the construction equipment-side communication modem unit and the locationlocational information received from the tracking vehicle-side GPS unit and command that the construction equipment-side communication modem unit make the transmission cycle of the location of the construction equipment shorter than a predetermined transmission cycle, if the calculated distance value is smaller than a predetermined distance value.

7. The system of claim 6, wherein the control unit stores the locational information of the construction equipment received from the construction equipment-side communication modem unit, and compares the locational information with current locational information of the construction equipment that is received in real time, and if the locational information of the construction equipment is changed, the control unit commands that the transmission cycle of the locational information of the construction equipment be made shorter than the predetermined transmission cycle.

8. The system of claim 4, wherein if the distance acquired by calculating the distance between the construction equipment and the tracking vehicle is less than the predetermined value, the control unit commands that a transmission cycle of locational information of a construction equipment-side communication terminal be changed in proportion to the calculated distance.

9. The system of claim 6, wherein if the distance acquired by calculating the distance between the construction equipment and the tracking vehicle is less than the predetermined value, the control unit commands that a transmission cycle of locational information of a construction equipment-side communication terminal be changed in proportion to the calculated distance.

* * * * *

UNITED STATES PATENT AND TRADEMARK OFFICE
CERTIFICATE OF CORRECTION

PATENT NO. : 8,606,431 B2
APPLICATION NO. : 13/502295
DATED : December 10, 2013
INVENTOR(S) : Jae Hoon Kim Page 1 of 1

It is certified that error appears in the above-identified patent and that said Letters Patent is hereby corrected as shown below:

In the Claims

Column 7, Claim 1,

Line 61, delete "based on the locational" and insert --based on both the locational--

Signed and Sealed this
Twenty-seventh Day of January, 2015

Michelle K. Lee
*Deputy Director of the United States Patent and Trademark Office*